Ira N. Saxe
INVENTOR.

June 4, 1957  I. N. SAXE  2,794,578
SEED HOPPER FOR CORN PLANTERS
Filed July 15, 1955  3 Sheets-Sheet 2

Ira N. Saxe
*INVENTOR.*

Ira N. Saxe
INVENTOR.

United States Patent Office 2,794,578
Patented June 4, 1957

2,794,578

SEED HOPPER FOR CORN PLANTERS

Ira N. Saxe, West Hurley, N. Y.

Application July 15, 1955, Serial No. 522,301

3 Claims. (Cl. 222—240)

My invention relates to improvements in seed hoppers for corn planters of the hill planting and drill planting type.

The primary object of my invention is to provide in such hoppers an improved bottom structure in which a rotary bottom plate distributes the seed in an improved manner to the cells of the rotary seed plate and forms therewith the hopper bottom.

Another object is to provide, in conjunction with the above, efficient hold-down means for the bottom plate and the seed plate and which centers the hopper body relative to said plates.

Another object is to provide a bottom drive plate for the seed plate which is highly efficient to distribute the seed in the bottom of the hopper to the cells of the seed plate.

Still another object is to provide an improved arrangement of seed cut off and knocker in the hopper.

Yet another object is to simplify such hoppers to reduce the cost of manufacture thereof and arrange all parts for easy removal, for replacement or repair.

Other objects, together with the precise nature of my improvements, will become readily apparent when the following description and claims are read with reference to the drawings accompanying and forming part of this specification and in which:

Figure 1:
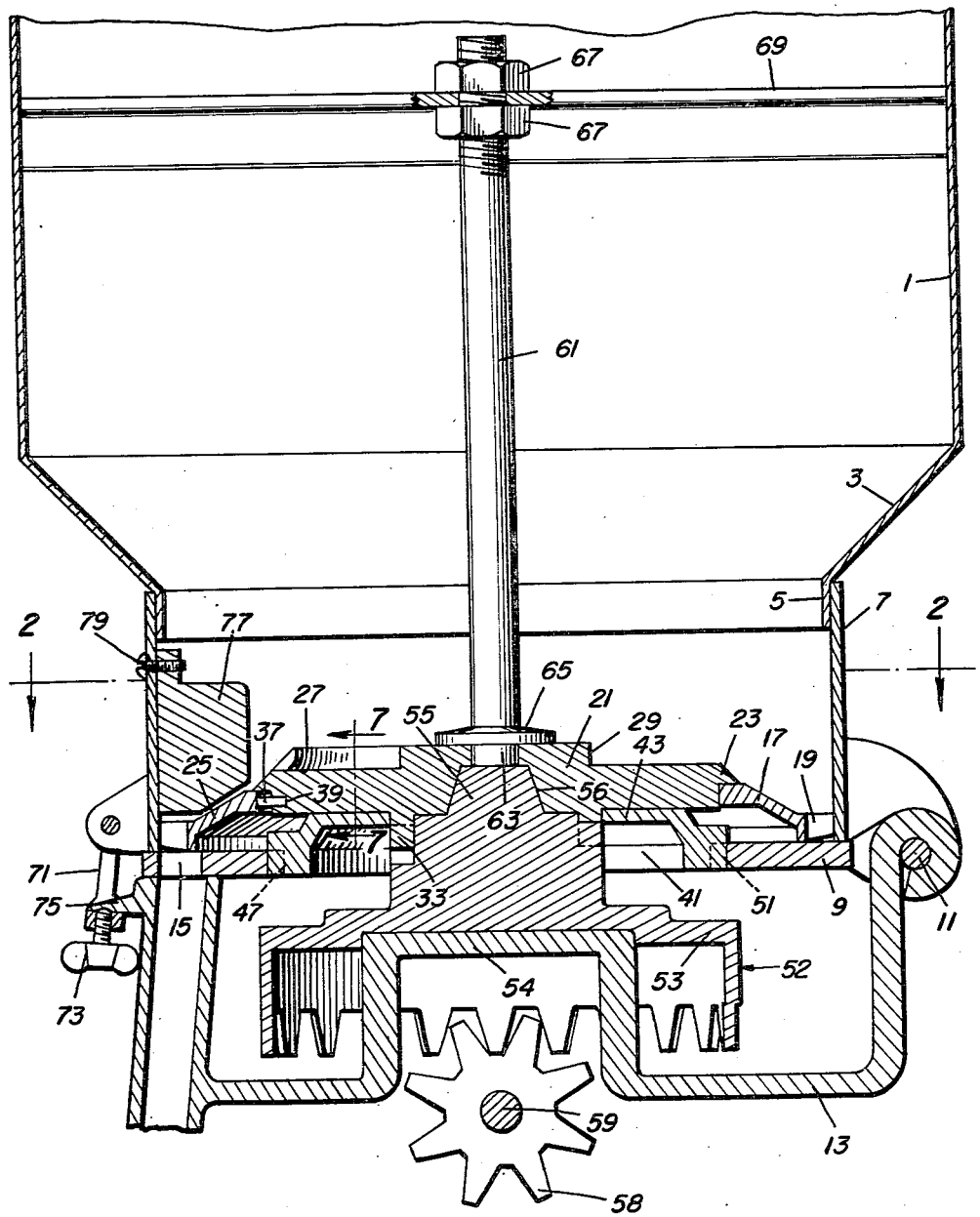
Figure 1 is a fragmentary view in vertical section of my improved hopper, taken on the line 1—1 of Figure 2.
Figure 2:
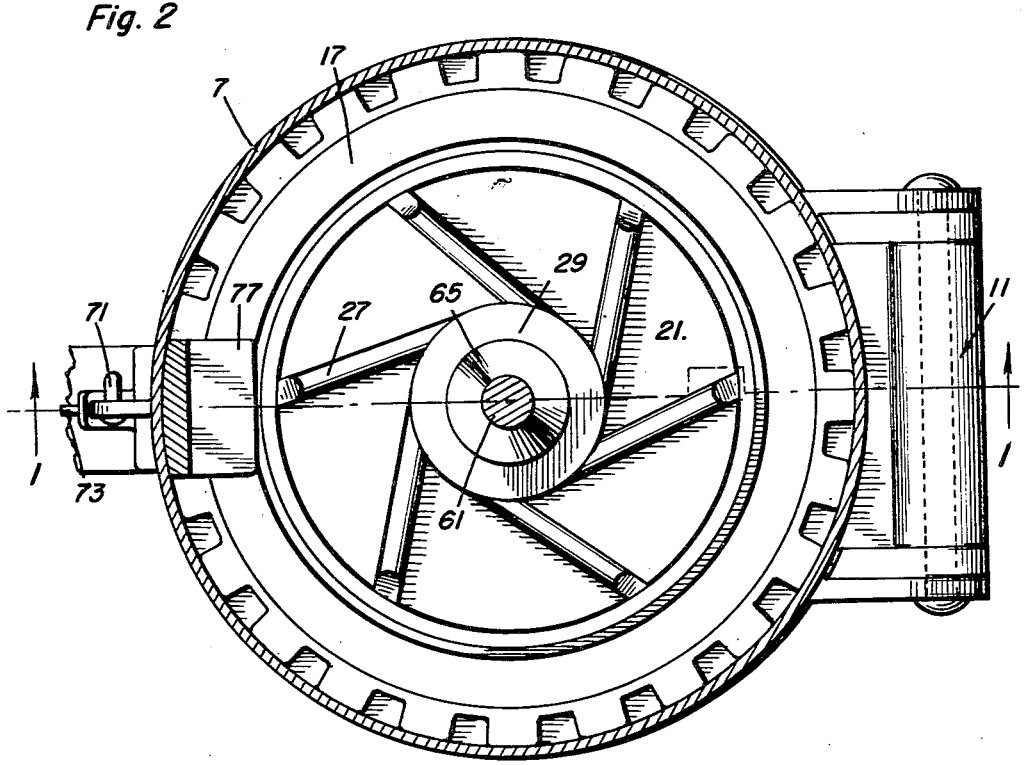
Figure 2 is a view in horizontal section taken on the line 2—2 of Figure 1.
Figure 7:
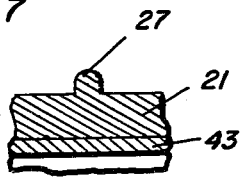
Figure 7 is a fragmentary view in vertical section taken on the line 7—7 of Figure 1.
Figure 8:
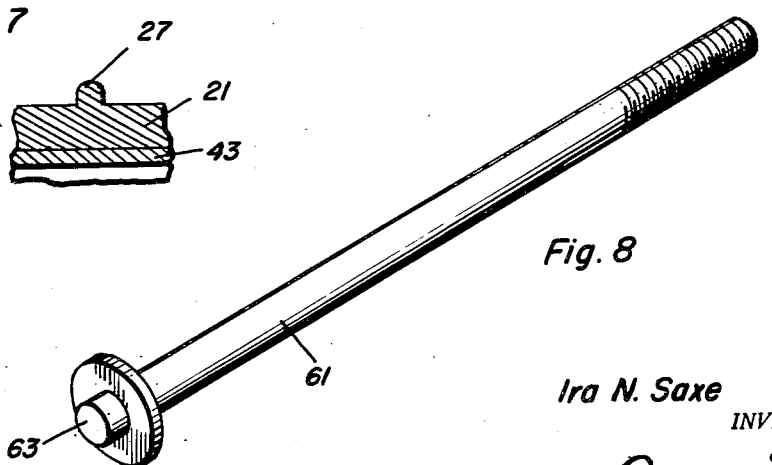
Figure 8 is a perspective view of a hold-down shaft for the rotary bottom plate.
Figure 3:
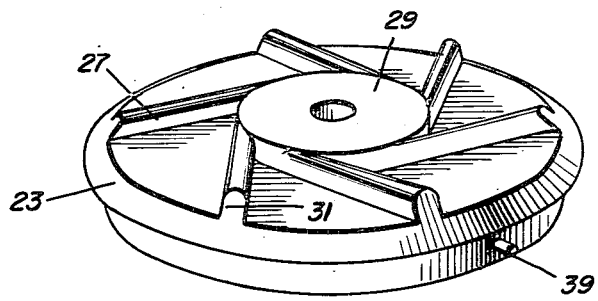
Figure 3 is a perspective view of the rotary bottom plate.
Figure 4:
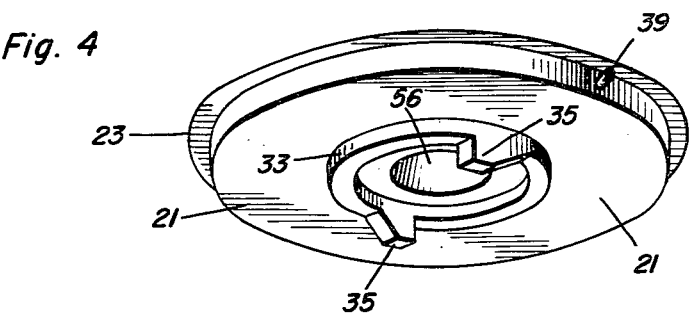
Figure 4 is an inverted perspective view of the same.
Figure 5:
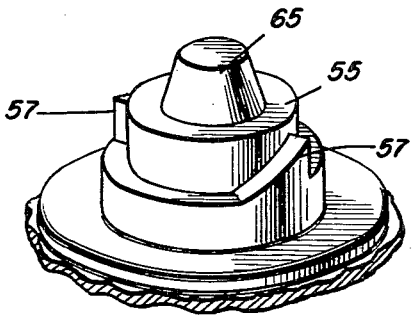
Figure 5 is a perspective view partly broken away and shown in section of the driving member for the rotary bottom plate.
Figure 6:
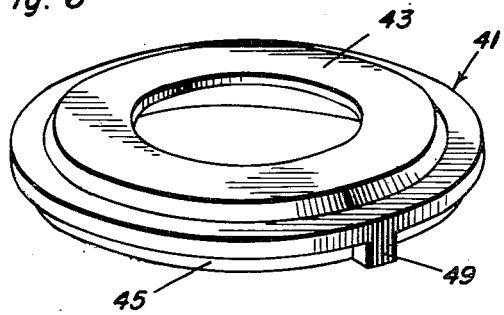
Figure 6 is a perspective view of the retainer plate for the rotary bottom plate.

Referring to the drawings by numerals, the body 1 of my improved hopper is generally cylindrical with an intermediate hopper wall section 3 having a bottom circumferential vertical flange 5 fitting in a bottom cylindrical vertical wall section 7. The bottom wall section 7 seats on the annular false bottom or plate 9 of the conventional seed hopper and together therewith is hinged, as at 11, to the seed boot and runner frame 13. The numeral 15 designates the usual seed drop for the plate 9.

The bottom wall section 7 surrounds the conventional annular seed plate 17 having edge cells 19 for registration with the seed drop 15 and which rotates directly over the bottom plate 9.

The rotary bottom plate 21 is annular, fits in the seed plate 17, is provided with an upper beveled, circumferential flange 23 overlying and wipingly engaging said plate 17 and inclining downwardly to the usual correspondingly inclined portion 25 of the seed plate, and is provided with top tangential ribs 27 radiating from a top hub 29 on said plate 21 and having outer ends 31 beveled to the flange 23. A driving hub flange 33 is provided on the bottom of said plate 21 with a pair of diametrically opposite vertical clutch teeth 35 thereon. A pin 37 and socket 39 are provided on the inner edge of the seed plate 17 and in the rotary bottom plate 21 to drivingly connect said plate 21 to said plate 17.

The retainer plate 41 is annular with a reduced upwardly offset flat center portion 43 seating the bottom plate 21 and is provided with a circumferential undercut 45 so that it fits in a central opening 47 in the false bottom plate 9 and seats on said plate 9. Radial lugs 49 on said plate 41 fit in notches 51 in said plate 9 to interlock said plates 41, 9. The flange 33 of the rotary bottom plate 21 depends through said plate 43 and is journaled for rotation therein.

The driving member 51 for the rotary bottom plate 21 comprises a horizontal crown gear 53 seating and journaled on a U-shaped bearing portion 54 of the frame 13 and having a stepped upstanding hub 55 fitting in the flange 33 in a socket 56 and in the bottom plate 21 with clutch teeth 57 on said hub portion 55 engaging the clutch teeth 35. The usual gear pinion 58 on a drive shaft 59 drives the crown gear 51.

Hold-down means for the rotary bottom plate 21 comprises an axial shaft 61 in the hopper having a lower end 63 fitting in said plate 21 and a circumferential bottom flange 65 seating on top of the hub 29 of said plate 21. The upper end of the shaft 61 is fixed by clamping nuts 67 in a diametrical cross-bar 69 fixed in the body 1 of the hopper.

Opposite the hinge 13 a pivoted bolt 71 on the wall section 7 with a wing nut 73 thereon and engageable with lugs 75 on the frame 13 releasably locks the hopper down on the false bottom plate 9.

The usual type of cut off and knocker member 77 is bolted, as at 79, on the wall section 7 at one side of the drop 15.

The operation of my invention will be readily understood. As the crown gear 51 is rotated, the rotary bottom plate 21 is rotated about the lower end 63 of shaft 61 and distributes the seed in the bottom of the hopper outwardly to the cells 19. The cut off and knocker 77 levels off the seed in cells 19 to fall through the drop 15. The ribs 27 on the bottom plate 21 distribute the seed in the bottom of the hopper to the cells 19 by deflecting the seed outwardly and evenly. By loosening the wing nut 73 and disengaging the bolt 71 from the lugs 75, but not removing the shaft 61, the hopper may be swung on the hinge 11 for access to the rotary bottom plate 21 which may then be disconnected from the seed plate 41 for removal of said plate 21, the seed plate 17 and the retainer plate 41 as occasion may require.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination with the seed boot frame of a corn planter and an annular false bottom plate supported on said frame of a hopper body having an annular bottom vertical wall section seating on said false bottom plate, an annular rotary seed plate in said section having circumferential edge cells for registration with said boot of said frame, an annular rotary bottom plate fitted in said seed plate and drivingly connected thereto, said seed and bottom plates forming the bottom of said hopper, an annular retainer plate supporting said bottom plate and fitted in and resting on said false bottom plate, tangential ribs on said bottom plate for distributing seed to said seed plate, means in said hopper engaged with said bottom plate to hold the same down in said section, and drive means for said bottom plate comprising a horizontal gear in said frame operatively connected to said bottom plate.

2. The combination of claim 1, said gear having an upstanding stepped hub fitting in said bottom plate and said bottom plate and hub having clutch teeth thereon operatively connecting said gear to said bottom plate.

3. The combination of claim 1, said first-named means comprising a diametrical bar in said hopper body, and a shaft depending from said bar and journaled in said bottom plate and having a flange therein seating on said bottom plate and rotatably engaged thereby.

References Cited in the file of this patent

UNITED STATES PATENTS

| 867,074 | Pearce | Sept. 24, 1907 |
| 1,397,689 | Krotz | Nov. 22, 1921 |
| 1,654,411 | Cole | Dec. 27, 1927 |

FOREIGN PATENTS

| 166,122 | Austria | June 10, 1950 |